(12) United States Patent
Schultz et al.

(10) Patent No.: US 11,475,553 B1
(45) Date of Patent: Oct. 18, 2022

(54) PRODUCTION-SPEED COMPONENT INSPECTION SYSTEM AND METHOD

(71) Applicant: Ford Global Technologies, LLC, Dearborn, MI (US)

(72) Inventors: Brodie Schultz, Ferndale, MI (US); Elizabeth Bullard, Royal Oak, MI (US); Francis Maslar, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/225,404

(22) Filed: Apr. 8, 2021

(51) Int. Cl.
| | | |
|---|---|---|
| *H04N 5/247* | (2006.01) | |
| *G06T 7/00* | (2017.01) | |
| *H04N 5/04* | (2006.01) | |
| *G06T 7/73* | (2017.01) | |
| *G06K 9/62* | (2022.01) | |
| *G06F 3/14* | (2006.01) | |
| *G06F 3/0482* | (2013.01) | |
| *H04N 5/225* | (2006.01) | |
| *H04N 5/265* | (2006.01) | |
| *G08B 5/36* | (2006.01) | |
| *G08B 21/18* | (2006.01) | |

(52) U.S. Cl.
CPC .......... *G06T 7/0004* (2013.01); *G06F 3/0482* (2013.01); *G06F 3/14* (2013.01); *G06K 9/6267* (2013.01); *G06T 7/73* (2017.01); *G08B 5/36* (2013.01); *G08B 21/18* (2013.01); *H04N 5/04* (2013.01); *H04N 5/2256* (2013.01); *H04N 5/247* (2013.01); *H04N 5/265* (2013.01); *G06F 2203/04806* (2013.01); *G06T 2200/24* (2013.01); *G06T 2207/20081* (2013.01); *G06T 2207/20212* (2013.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 2018/0322472 | A1* | 11/2018 | Russell | G06Q 30/0645 |
| 2019/0236772 | A1 | 8/2019 | Cho et al. | |
| 2201/9023677 | | 8/2019 | Cho et al. | |
| 2020/0090321 | A1* | 3/2020 | Xu | G06Q 10/10 |
| 2021/0398271 | A1* | 12/2021 | Lee | G06T 7/001 |

FOREIGN PATENT DOCUMENTS

| | | |
|---|---|---|
| CN | 105069807 | 3/2018 |
| CN | 111462120 | 7/2020 |

\* cited by examiner

*Primary Examiner* — Eileen M Adams
(74) *Attorney, Agent, or Firm* — Burris Law, PLLC

(57) ABSTRACT

An inspection system for automotive components includes one or more cameras, a controller, a conveyor structure, and a row of platforms. The cameras are configured to collect images corresponding to a selected automotive component. The controller is communicably coupled to the cameras. The conveyor structure is operable to transport the selected automotive component. The cameras are synchronized and triggered to capture images of the selected automotive component with the controller. The controller is configured to generate a composite image based on the data set and generate, at a production speed, an output indicative of the selected automotive component with or without anomaly.

20 Claims, 12 Drawing Sheets

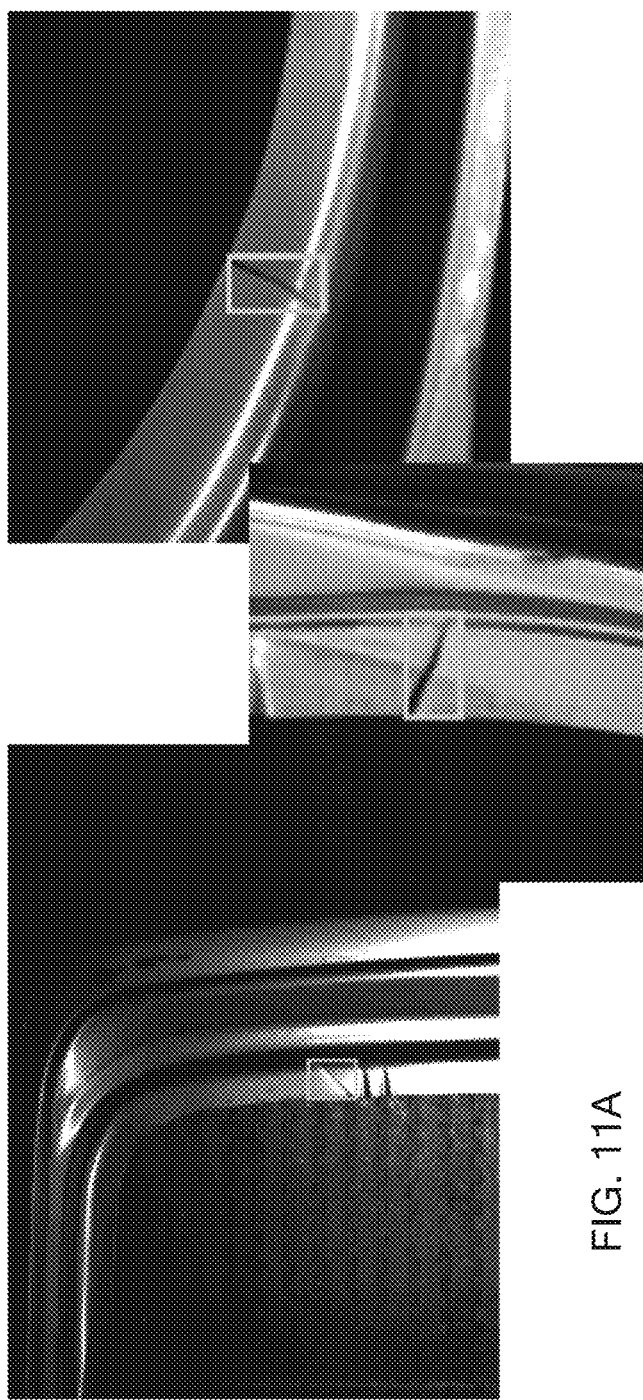

PRODUCTION-SPEED COMPONENT INSPECTION SYSTEM AND METHOD

FIELD

The present disclosure relates to a production-speed component inspection system and method.

BACKGROUND

The statements in this section merely provide background information related to the present disclosure and may not constitute prior art.

Automotive manufacturing involves inspection of faulty components. For instance, in stamping, defect detection relies on manual inspection of a panel, first at a high-level review by an operator moving parts from the end of a line conveyor to a shipping rack. A trained quality representative pulls panels at random from the line for an in-depth review of critical points. An inspector is expected to notify an area supervisor when a defect is identified.

It may be challenging for an inspector, especially when the same inspector is in charge of moving parts into the shipping rack, to keep up with production speed at which their base task is accomplished. Factors such as the repetitiveness of this task, and the amount of area that must be evaluated on the part, while it is being moved to the rack, may add more challenges. These and other issues related to inspecting parts are addressed by the present disclosure.

SUMMARY

This section provides a general summary of the disclosure and is not a comprehensive disclosure of its full scope or all of its features.

In one form, an inspection system for automotive components includes one or more cameras, a controller, a conveyor structure, and a row of platforms. The cameras are configured to collect images corresponding to a selected automotive component. The controller is communicably coupled to the cameras. The conveyor structure is operable to transport the selected automotive component. The cameras are synchronized and triggered to capture images of the selected automotive component. The controller is configured to generate a composite image based on the data set, recognize presence or absence of an anomaly based on the composite image of the selected automotive component via artificial intelligence based training, determine whether an anomaly is present with respect to the selected automotive component, and generate an output indicative of the selected automotive component with or without anomaly prior to the selected automotive component being removed from the conveyor structure.

In one variant, the cameras are synchronized and triggered, via a light curtain, to capture the images of the selected automotive component substantially simultaneously. In another variant, the inspection system further includes a row of one or more platforms installed at or adjacent to an entry point of the conveyor structure. Each platform spaced apart from a neighboring platform and having a plurality of cameras installed thereon. The row of one or more platforms is arranged to be in parallel to the conveyor structure such that the cameras face and capture images of the selected automotive component transported on the conveyor structure.

In another variant, the controller is further configured to, upon detection of the anomaly, identify a location of the anomaly at the production speed by mapping to an original component coordinate system of the composite image. In further another variant, the controller is further configured to display the selected automotive component having anomaly with a location of the anomaly on a user interface at the production speed.

In some form, the controller is further configured to identify a classification of the anomaly via artificial intelligence based training.

In another form, the inspection system further includes a light emitting diode (LED) fault indicator installed in the conveyor structure and extends in a direction along which the conveyor structure extends. The LED fault indicator is configured to output a first color upon determination that the selected automotive component is normal and output a second color upon determination that the selected automotive component is defective. The LED fault indicator further comprises a sequence of LED lights and an LED light output in the second color follows the defective component as the defective component transports on the conveyor structure.

In another variant, the controller is further configured to generate the output that displays the selected automotive component and a zoomed view of a defect of the selected automotive component. The controller is further configured to generate the output including a menu that prompts selection of a scrap of the selected automotive component upon determination that the selected component is defective, two or more selected automotive components side by side, a total count of selected automotive components, and a total count of defective components. The controller is configured to update the output on a quasi-real time basis.

In further another variant, the inspection system further includes a plurality of LED strip lights, and a plurality of LED diffusion lamps. The plurality of LED strip lights and the plurality of LED diffusion lamps provide lighting for operations of the cameras.

In some forms, an inspection method of automotive components includes steps of (i) transporting, on a conveyor structure, a selected automotive component, (ii) arranging a network of cameras opposite to and parallel to the conveyor structure, (iii) as the selected automotive component enters the conveyor structure, capturing image data of the selected automotive component with the network of cameras to obtain a set of data in a synchronized manner, (iv) receiving, at a controller communicably coupled to the cameras, the image data from the cameras, (v) generating a composite image based on the image data from the cameras, (vi) determining, by the controller including a deep learning network, whether an anomaly is present with respect to the selected automotive component based on identification from the composite image, and (vii) generating, by the controller at a production speed, an output indicative of the selected automotive component with or without anomaly.

In another form, the inspection method further includes, upon detection of the anomaly, identifying a location of the anomaly at a production speed by mapping to an original component coordinate system of the composite image.

In one variant, the inspection method further includes identifying a classification of the anomaly via an artificial intelligence classification based training. The step of generating the output further comprises displaying the selected automotive component having anomaly with a location of the anomaly on a user interface at the production speed.

In another form, the inspection method further includes, displaying, at a production speed, the output on a user interface screen in response to the anomaly being present, wherein the output includes a zoomed view of the anomaly and a menu button that prompts a scrap of the selected automotive component.

In yet another form, an inspection method of automotive components includes steps of (i) capturing an image data of a selected component and generating a set of data with a row of camaras installed over a predetermined area of a conveyor structure from an entry point of the conveyor structure, (ii) generating, by a controller, a composite image of the selected component, (iii) determining, by the controller including a deep learning network, whether anomaly is present, (iv) upon detection of the anomaly, identifying a type of the anomaly and a location of the anomaly based on a coordinate system of the prestored anomaly template, wherein the anomaly comprises one or more of splits, burrs, scratches, or slug marks, and (v) generating on a user interface, by the controller at a production speed, a display of the selected component, an anomaly at a location of the selected component, and a zoomed view of the anomaly.

In at least one variant, the inspection method further includes, generating, at the production speed, an output that prompts or alerts removal of the selected component from a production line.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 11A illustrates one example of a split image at one location;

FIG. 11B illustrates another example of a split image at a location different from that shown in FIG. 11A;

FIG. 11C illustrates further another example of a split image at a location different from that shown in FIG. 11B;

Figure 1:
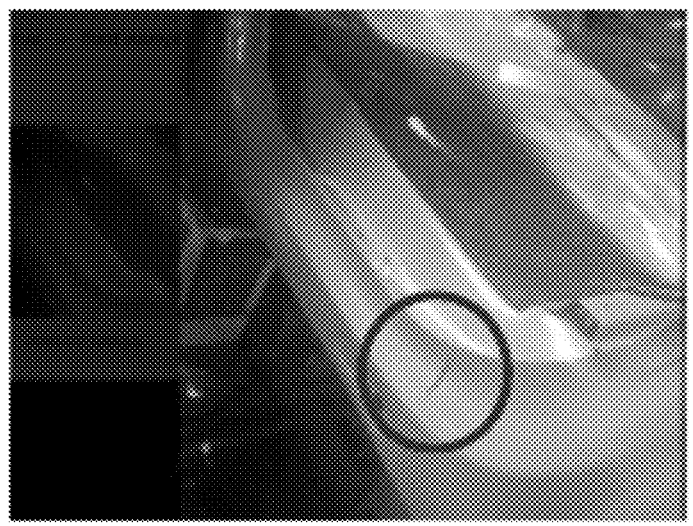
FIG. 1 illustrates one example of a split defect that appears on an automobile.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A production-speed component inspection system (i.e., "component inspection system") and method according to the teachings of the present disclosure can detect defective components at a first process of manufacturing automotive vehicles and thus, can mitigate the effect on downstream processes and ultimately, the final vehicle assembly. As provided herein, the component inspection system/method develops a two-dimensional (2D) image based on image data of at least a part of the component or product captured by one or more cameras. Based on the 2D image and an artificial intelligence (AI) based identification and classification, the component inspection system/method may identify and analyze the component and provide a result at a production rate or production-speed. In other words, the component inspection system/method may identify and analyze the component and provide a result prior to the selected automotive component being removed from the conveyor structure.

The component inspection system and method detects anomalies of automotive components. The anomalies of automotive components may include splits, burrs, scratches, slug marks, etc. Different types of defects tend to occur more frequently at particular locations. For instance, splits may occur more frequently at an edge of a door panel, and scratches may occur more frequently at the top of a curved surface. As an example, FIG. 1 illustrates a split defect present on an automobile (see circled area). The component inspection system and method according to the teachings of the present disclosure detects the split defect on the component prior to the component being assembled on to the vehicle and thus, can inhibit or reduce the chance that the defected component proceeds to downstream processes.

Figure 2:
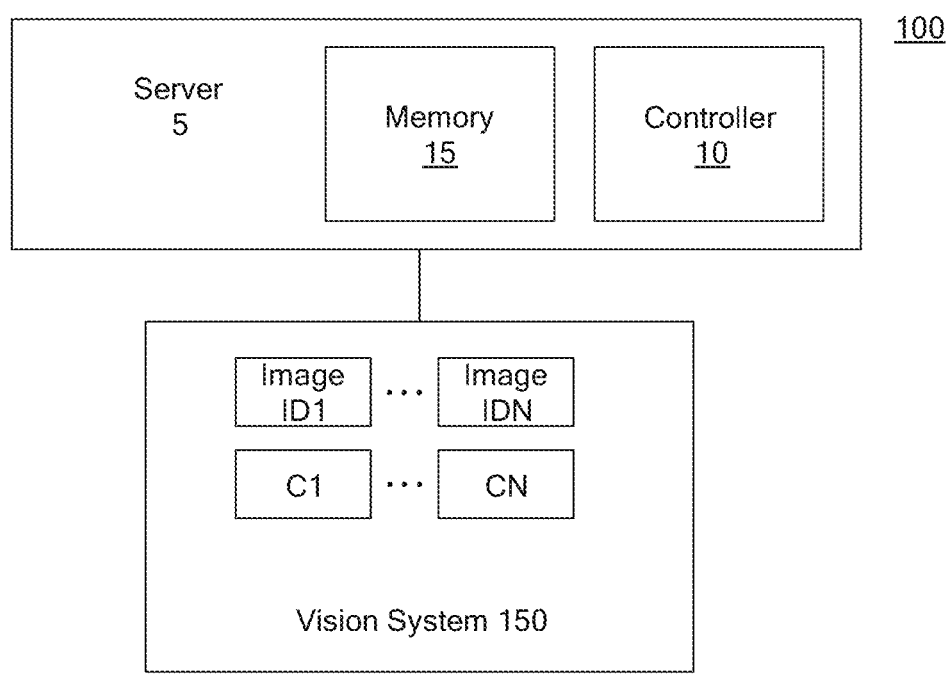
FIG. 2 is a block diagram of a production-speed component inspection system according to the teachings of the present disclosure.

FIG. 2 is a block diagram of a component inspection system 100 according to one form of the present disclosure. In one form, the component inspection system 100 for automotive components includes a vision system 150 having one or more multi-dimensional cameras C1 to CN. The inspection system 100 further includes a server 5 that includes a controller 10 and memory 15. The inspection system 100 operates with a conveyor structure operable to transport a selected automotive component, as will be shown and described in connection with FIG. 3 below.

The cameras C1, CN of the vision system 150 are configured to capture images of the selected automotive component such as, but not limited to, stamped panels, door opening panels, hoods, and/or fenders. In some forms, the component data captured by the cameras C1, CN are provided in the form of a 2-D image data, as will be described more in detail below. Another form of a vision system will be described further in detail below in connection with FIGS. 4A and 4B.

In some forms, the cameras C1, CN are 12-megapixel monochrome cameras, although the present disclosure is not limited thereto. The cameras C1, CN are triggered to capture image data of the selected automotive component by the control of the server 5 in various manners. In some forms, the cameras C1, CN include a 2D digital camera (monochrome cameras) that capture two dimensional (2D) images ID1, IDN which are provided to the server 5, respectively. In one form, the cameras C1, CN are configured to detect small surface defects in large patches of the surface area as needed.

In at least one variation, the cameras C1, CN may provide information that generates, taken together, a 3D image of the component.

In some forms, the image data collectively represent a structure of the selected automotive component. For the purpose of convenience of explanation, the selected automotive component is described as a front door panel, but the present disclosure is applicable to other components and should not be limited to a front door panel.

Figure 3:
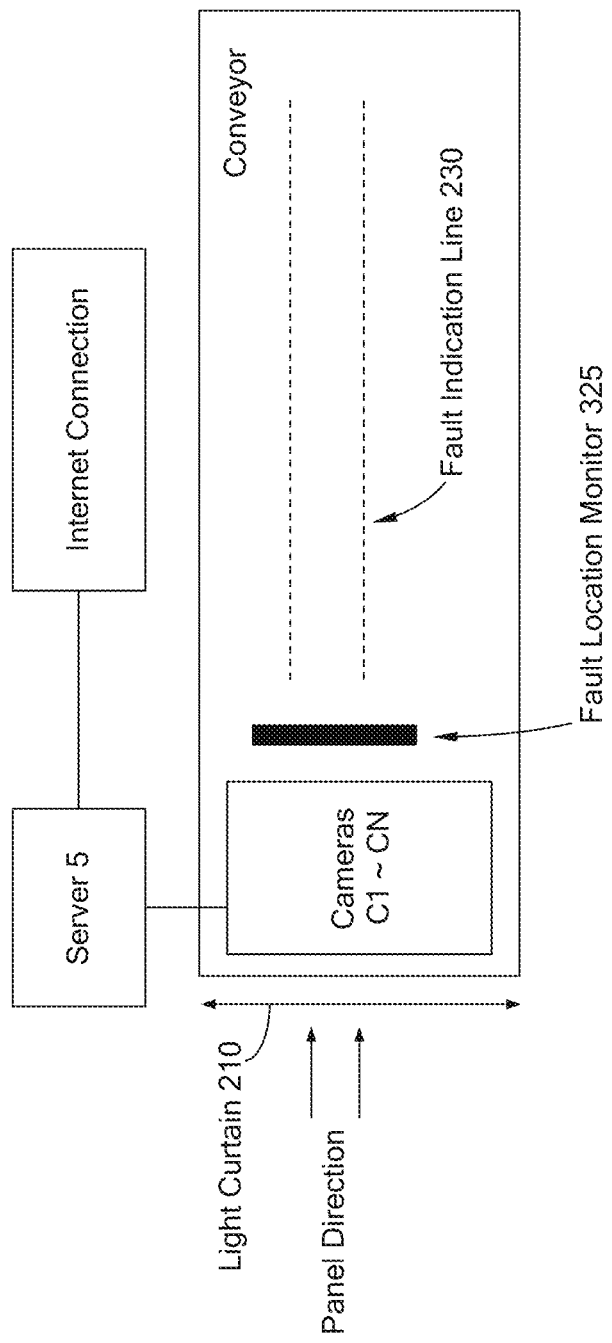
FIG. 3 illustrates one exemplary configuration of the inspection system of FIG. 2.

FIG. 3 illustrates an exemplary configuration of an inspection system having cameras C1~CN. In one form, six cameras C1~C6 (i.e., N=6) are arranged in two rows facing each other. A light curtain 210 is arranged at an entry point of a component onto the conveyor 250. The server 5 is coupled to the cameras C1~CN and configured to control operations of the cameras C1~CN. For example, the server 5 is configured to control the cameras C1~CN to capture images of a component by triggering the cameras C1~CN substantially simultaneously.

In some forms, the cameras C1~CN are triggered via a light curtain 210. As each component passes through the light curtain 210 and proceeds to the conveyor 250, the cameras C1~CN are triggered to be turned on and capture the images of each component. Once the images are captured, the cameras C1~CN operate to transmit image data to the server 5 via wired or wireless communication. Alternatively, or additionally, the cameras C1~CN may store the images in internal storage for later transmission or backup.

Although not shown, diffusion lights may be provided along with the cameras C1~CN. Diffusion lights are described below in connection with FIG. 4B. In some forms, additional LED lights may be provided for the cameras C1~CN. LED lights may be arranged adjacent to the cameras C1~CN and installed in structures above the conveyor 250. This facilitates, components on the conveyor 250 passing under the cameras C1~CN, to be illuminated with the LED lights and provide optimal lighting for operations of the cameras C1~CN.

By way of example, the conveyor 250 has a belt speed of 1 m/s. In a single cycle, multiple parts can be run. For example, a number of components or parts moving on the conveyor 250 may be about fifteen (15) to sixty (60) parts per minute, depending on parts being run.

The conveyor 250 is equipped with fault indication lines 230 implemented with light emitting diodes (LEDs) as shown in FIG. 3. By way of example, the fault indication lines 230 may include LED strip lights. In some forms, one or more LED strip lights may be displayed with different colors, such as green, red, blue, etc. For example, green color may indicate a normal component and red color may indicate a defective component. In some forms, a red color indicator may follow movement of the corresponding component while a plurality of normal and defective components continuously move on the conveyor 250. As one example, a red LED light follows a defective component while green LED lights follow normal components, as will be shown in FIG. 7A below.

A fault location monitor 235 is arranged at a location where a component enters into the conveyor 250 and passes the cameras C1~C6. In some forms, the fault location monitor 235 displays components entering onto the conveyor 250 such that an operator can detect and determine whether components may be off the path or disposed at a location where one or more of the cameras C1~C6 may not reach or obtain optimal image.

Referring back to FIGS. 2-3, the multi-dimensional cameras C1-CN (or C6), and the fault location monitor 235 are arranged relative to the conveyor 250 and the component on the conveyor structure in order to capture images of the component and detect fault location of the component. In other forms, the fault location monitor 235 may be arranged at a different location from the conveyor 250.

Referring back to FIG. 2, the server 5 is communicatively coupled to the vision system 450 which includes the cameras C1, CN to receive the images ID1, IDN. As shown in FIG. 3, the server 5 is coupled to the cameras C1~C6, and the fault indication lines 230 and configured to control operation of the cameras C1~C6 and the fault indication lines 230. The server 5 is also coupled to the fault location monitor 235.

Figure 4B:
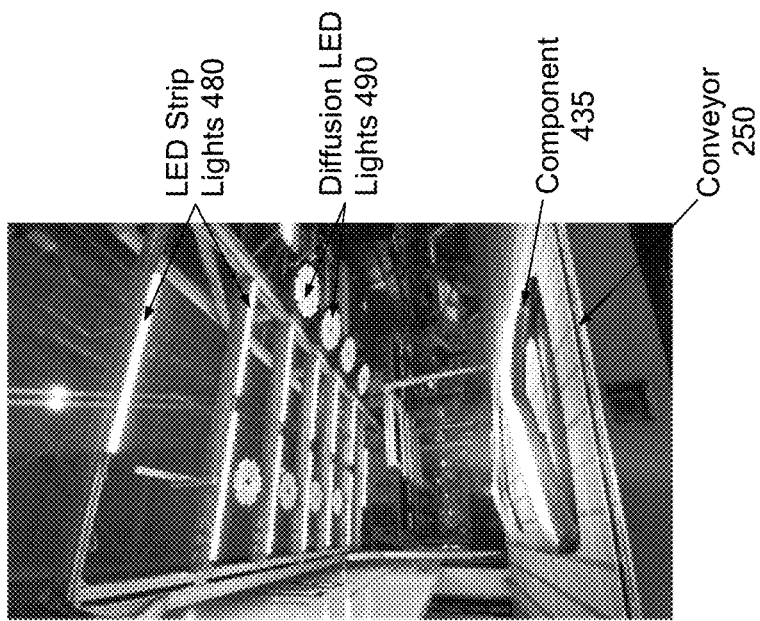
FIG. 4B is a side perspective view of the vision system of FIG. 4A from a different angle.
Figure 4A:
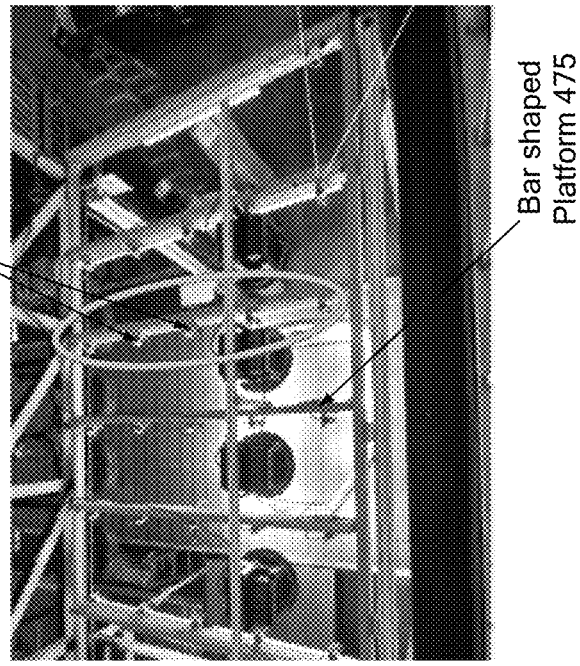
FIG. 4A is a perspective view of a vision system for use in a component inspection system in an actual manufacturing site setting.

FIG. 4A is a perspective view of a vision system 450 for use in the component inspection system 100 in an actual manufacturing site setting. The vision system 450 includes a plurality of cameras 425 arranged side-by-side on a bar shaped structure 475. Each bar shaped structure or platform 475 is arranged to form a plurality of rows. By way of example, five (5) cameras 425 are installed on each bar platform 475 and five (5) bar platforms 475 are arranged as shown in FIG. 4A, which includes a total of twenty-five (25) cameras 425 included in the vision system 450. FIG. 4A illustrates five rows of the bar platform 475 but the present disclosure is not limited thereto. For instance, a single bar platform with a plurality of cameras may be sufficient to capture an image data of a component 435. The number of cameras in use may vary depending on a component type, a cycle time, and/or a speed of the conveyor 250, among other factors.

FIG. 4B is a side perspective view of the vision system 450 from a different angle. As shown in FIG. 4B, the vision system 450 includes a plurality of LED strip lights 480 and a plurality of diffusion LED lights 490 arranged along the rows of the bar structure 475. The LED strip lights 480 and the diffusion LED lights 490 provide lighting optimal for operations of the cameras 425. By way of example, the diffusion LED lights 490 may output 500 watt and about eight (8) LED lights may be provided.

As shown in FIGS. 4A and 4B, the component 435 enters into the entry point of the conveyor 250 and passes under the cameras 425. The operations of the cameras 425 are synchronized and triggered substantially simultaneously via the light curtain 210 shown in FIG. 3. Referring back to FIG. 3, the light curtain 210 is arranged at the entry point of the conveyor 250. As the component 435 moves through the light curtain 210, such movement triggers the operations of the cameras 425 by the control of the server 5. In other forms, the operations of the cameras 425 may not be completely synchronized and may be performed in an asynchronized manner.

In some forms, the cameras 425 may capture the image data of the component 435 all at once. In other forms, the cameras 425 may capture the image data of the component 425 twice or more. The cameras 425 are spaced apart from one another and capture different parts of the component 435. Image data indicative of the different parts of the component 435 are transmitted to the server 5 as shown in FIG. 1. In some forms, each of the cameras 425 is equipped with a CPU and a memory and communicates with the server via wired or wireless. The server 5 receives the image data from the cameras 425 and processes the image data for anomaly detection.

In other forms, the cameras 425 may capture video data of the component 435, instead of still images. The cameras 425 may capture video data for a predetermined time at different locations.

Figure 5:
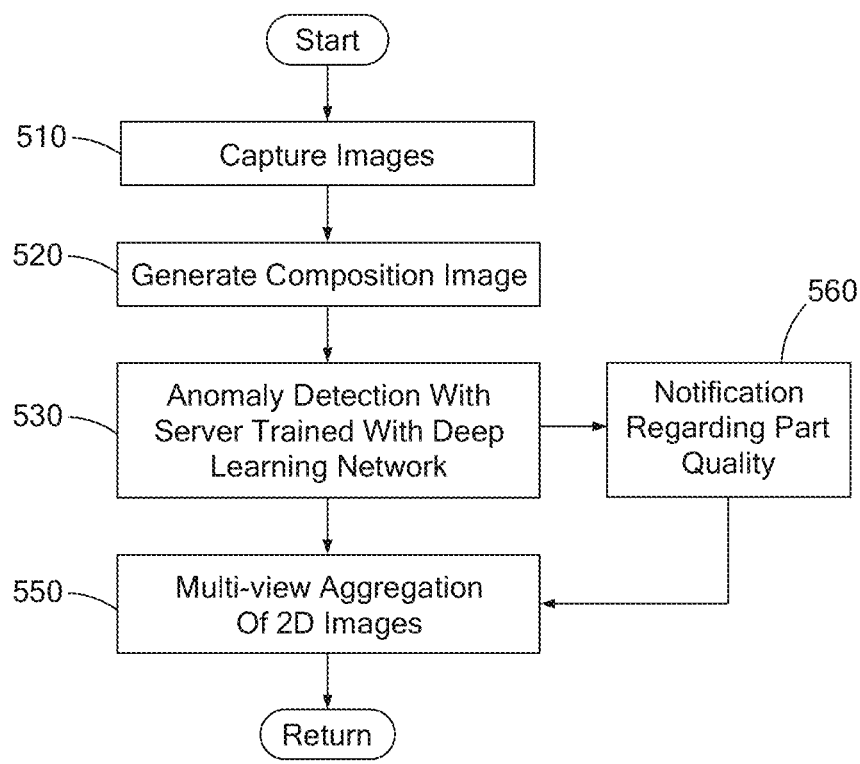
FIG. 5 is a flowchart of a defect-anomaly detection routine according to the teachings of the present disclosure.

Referring back to FIG. 2, the server 5 includes the memory 15 for storing instructions to be executable by the controller 10. In some forms, upon execution of the instructions, the controller 10 of the server 5 is configured to perform operations as illustrated in FIG. 5. In some forms, the controller 10 is implemented with an array of deep neural networks that takes the image data, detects anomalies, and identifies their locations substantially in real time. By using the deep neural networks and processing the image data, the controller 10 may perform inspection and detection of anomalies even though a panel has a large size and/or unique curvatures or profiles, the size of defects is large, or a required cycle time varies. In other forms, a different type of cameras can be used with or without the deep neural networks as long as such cameras produce conforming image data.

Referring to FIG. 5, an example defect-anomaly detection routine is provided and performed by the component inspection system 100. At 510, images of automotive components are captured by one or more cameras from many different directions. The cameras generate image data based on the captured images and transmit to the server 5, at 510. The server generates a composite image based on the image data at 520.

The server 5 executes instructions to detect anomaly based on the composite image. In some forms, the server 5 is configured to execute artificial intelligence algorithm to detect anomaly. For instance, the server 5 is implemented with a deep learning network for detecting anomaly. The server 5 is in a trained state with training data indicative of various defects such as splits, burrs, a slug mark, etc. By way of example, the training data may include template images or CAD models of various defects. Through the training using the deep learning network, the server 5 determines anomaly based on the composite image of the selected automotive component 435 at 530. The server 5 can identify and determine a particular type of defect as the server 5 is trained to learn and know anomaly. For instance, the training process of the server 5 may involve comparing one or more template images of defects with normal conditions numerous times during the training process. The training process of the server 5 may use training data representing deviation from normal conditions and/or different characteristics from those of normal conditions. Upon recognizing and determining that the composite image shows anomaly, the server 5 classifies the composite image as a component with a particular defect, at 530.

The deep neural network is of relatively smaller size due to the vastly smaller set of possible outputs. In at least one of variants, the neural network may evaluate the panel type in tens of milliseconds. At 530, the server 5 may recognize anomaly with a confidence level. In some forms, a reference confidence level is predetermined and stored in the memory. The confidence level may be compared with respect to the reference confidence level and identification or determination of anomaly can be confirmed with the confidence level exceeding the reference confidence level.

Additionally, based on the composite image, the server 5 identifies a type of automotive component provided in the composite image via, for example, an artificial intelligence classification training, at 530. Specifically, the server 5 recognizes and determines whether the selected automotive component is a door opening panel, a hood, a roof, etc. In one form, the server 5 is trained to learn and identify a front door panel, for example, by using training data that involve different automotive components. In some forms, a deep neural network is used to identify the panel type such as a front door panel, a rear door panel or else.

In some forms, the memory 15 is also configured to store training data for training the server 5 to determine anomaly of the selected automotive component. By way of example only, the training data may include template CAD models that correspond to a normal or nominal condition of the selected automotive component, i.e., having no anomaly or defect and template CAD models that represent various defects. If there is deviation, the server 5 proceeds to an anomaly detection process provided in steps 540.

Different training data relating to different types of anomalies are aligned with respect to the image data. The anomalies of automotive components may include as splits, burrs, scratches, slug marks, etc. In some forms, different types of defects may be classified and training data corresponding to different defects are generated and prestored in the memory of the server 5. For example, one or more training data relating to splits, for training artificial intelligence, are generated and prestored. Likewise, training data relating to burrs, scratches, slug marks, etc. may be prestored for training the server 5 using an artificial intelligence program. Additionally, or alternatively, the training data are subject to update and adjustment on ongoing basis. In some forms, correct determination and incorrect determination may be fed back and used to update and adjust the training data. The confidence level may be adjusted and updated as the training data are updated and adjusted.

In some forms, the server 5 is trained to learn different types of anomalies. In one form, the server 5 includes neural networks that learn and recognize different types of defects by training. In some forms, pattern recognition techniques may be used and the server 5 is trained to learn different defects by using training data.

In some forms, training data include anomaly detection templates. Anomaly detection templates may include estimated inlier templates that represent normal components or components without a particular defect. For example, with respect to splits type defects, anomaly detection templates represent a component having no splits type of defect. In at least one variant, one or more anomaly detection templates may be generated. In another variant, the anomaly detection templates may include different templates that represent different degrees of a particular type of defect within the range of the normal condition.

In some forms, the training data may be used to generate the estimated inlier templates. The training data may include outlier models which indicate different types of defects. In one form, using the pattern recognition technique, the server 5 learns to detect patterns and characteristics from the patterns.

In some forms, the training of the server 5 may involve learning with different templates and eventually, can recognize and determines whether different types of defects are present. For example, if an image data reconstructing a front door panel may have scratches and burrs, the server 5 recognize these anomalies through artificial intelligence based training with anomaly templates and determine presence and types of these anomalies with a reliable confidence level. In other forms, the server 5 may be trained to associate the anomaly templates with locations of the image data.

Figure 7:
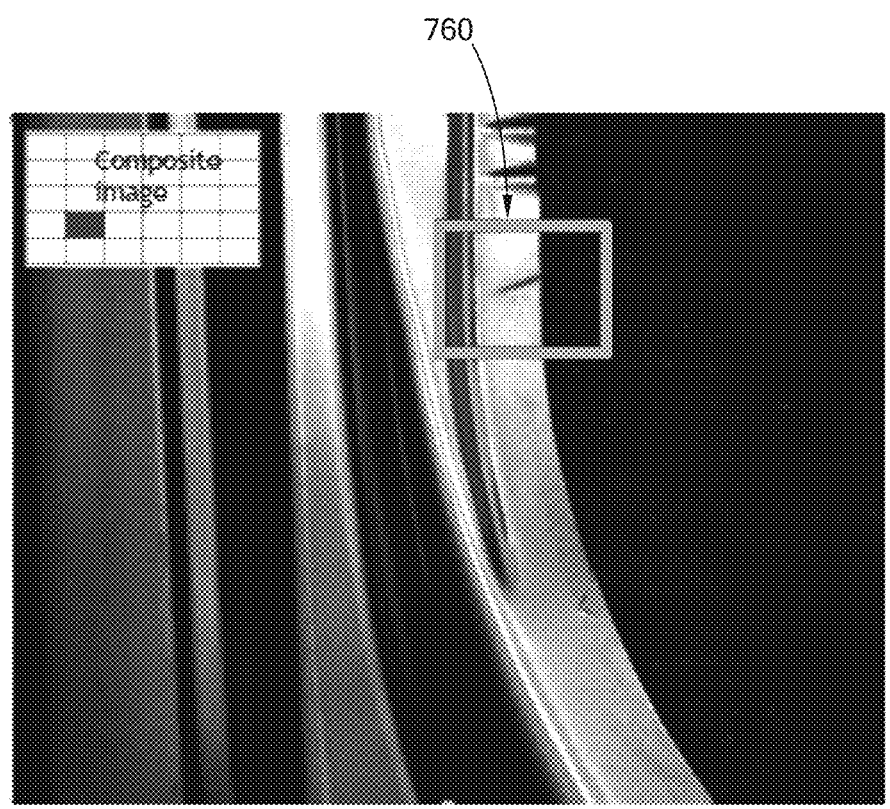
FIG. 7 illustrates a display of a composite image including a split defect and location thereof according to the user interface.

Once the defect is identified, the server 5 identifies the exact (x. y, z) anomaly centroid location relative to the selected origin as shown in FIG. 7B. The detected anomaly is to be mapped back to the original panel coordinate system. The anomalies may also be classified as splits, burrs, scratches, slug marks, etc. As shown in FIG. 7B, a defect appears at one location of the panel and the location of this defect is mapped to the original panel coordinate system.

As described, the server 5 identifies and recognizes presence of anomaly, a type of the selected automotive component, and/or a type of anomaly based on the composite image. As described above, the server 5 may receive video data from the cameras 425. In some forms, the server 5 may extract still images from the video data and compare with the prestored template images as described above. In other forms, video data that show a component having normal condition may be stored as a prestored video template. In addition, video data showing different types of components and/or different types of defects can be prestored.

The server 5 generates, at a production speed, an output indicative of the selected automotive component with or without anomaly, at 560. More particularly, if no difference is detected, the server 5 issues a notification indicating the component is fine/acceptable (e.g., text on a screen, green screen with or without text, among other indicators. Once the anomaly is determined at 540, the server 5 may issue notification identifying the anomaly, providing an image of the model with estimated position of anomaly, or other suitable notification. In lieu of or in addition to the notification provided after step 540, the server 5, may indicate at 560 that a difference has been detected. Notification can be provided on one or more user displays, examples of which are provided below.

In one form, all computations by the server 5 take approximately less than 10 seconds, and more particular, less than 3 seconds. These computation times can accommodate production speed. By way of example only, a typical cycle time is about 3.5 seconds and the conveyor structure typically moves panels from the end of the line at roughly 1.0 meter per second. Based on this information, production speed computations indicate that data from a panel on the conveyor structure are collected and analyzed, and a result is displayed in less than 10 seconds. This time constraint can be met with the inspection system according to the teachings of the present disclosure. The computation speed of the inspection system 100, particularly at the server 5, is 10 seconds or less by way of example.

Additionally or alternatively, at 550, a multi-view aggregation takes place with respect to an adjacent part of the selected automotive component in order to analyze the adjacent part. More specifically, the image data is sliced into one or more multi-view data sets for the adjacent part of the selected automotive component as different scanners may provide overlapping views for the adjacent part. The adjacent part may have a curved shape, be prone to more defects due to bumping, contacting, etc., and therefore, more detailed inspection may be desirable. After slicing the aggregated data set into one or more multi-views, the server 5 subsequently re-aggregate the multi-views into the image data, at 550. Data generated by the server 5 may be employed to further improve the operation of the server 5 and in one form, can be stored in a database (not shown) that may be separate from the server 5.

Figure 6:
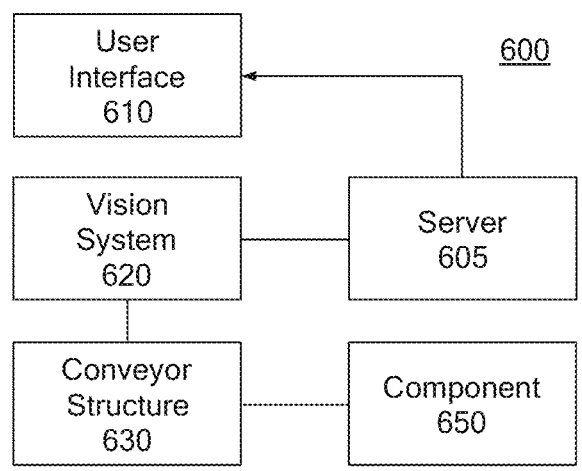
FIG. 6 is a block diagram of a component inspection system having a user interface according to the teachings of the present disclosure.

FIG. 6 is a block diagram of another form of a component inspection system 600. In FIG. 6, the component inspection system 600 includes a server 605, a user interface 610 and a vision system 620. A component 650 is transported at a certain speed on a conveyor structure 630. The component inspection system 600 is arranged adjacent to the conveyor structure 630 and collects component data from the component 650 while the component 650 is moving on the conveyor structure 630. In some forms, the user interface 610 is a display that is easily accessible or visible to operators working at the conveyor structure 630. This allows operators to check the component 650 on the user interface 610 and scrap the component 650 off from the conveyor structure 630 if the user interface 610 indicates anomaly including a defect. Additionally or alternatively, the user interface 610 includes an audio speaker that produces a notification signal or an alarm.

The server 605 operates to process and analyze the data collected by and transmitted from the vision system 620. In some forms, the operations of the server 5 as discussed above can be referred to with respect to operations of the server 605. In some forms, the structures and operations of the server 605 and the vision system 620 are identical or similar to those of the inspection system 100. In other forms, the server 605 may not include neural networks and use conventional CPUs without neural networks. In another form, the vision system 620 may be implemented with multi-dimensional cameras. In further another form, the vision system 620 may generate video data of the component 650 captured by two-dimensional cameras. In further another form, the vision system 620 includes a network of cameras arranged as shown in FIGS. 4A and 4B.

In order for an operator to scrap a component with a defect from the conveyor structure 630, computation times by the server 650 may correspond to the time that the component 650 reaches the end of the line of the conveyor structure 630. The server 650 is arranged in a network proximity to the conveyor structure 630 in order to prevent a potential network delay or buffering. In some forms, the server 650 and the vision system 620 are arranged to be physically close to the conveyor structure 630 but the teachings of the present disclosure are not limited thereto.

FIG. 7A illustrates one example of an operator monitor 700 according to the teachings of the present disclosure. As shown in FIG. 7A, the operator monitor 700 is arranged adjacent to a conveyor where a plurality of components 750 are transported. A plurality of cameras 725 are arranged and the components 750 pass under the cameras 720. For convenience of explanation, components 750 include one defective component 755 shown with a red indicator. Components 750 shown with a green indicator have no defect.

FIG. 7B illustrates one example of a composite image on the operator monitor 700 of FIG. 7A. On the operator monitor 750, a composite image of a component and a zoom view 760 of a defect, i.e., splits, are displayed. The composite image as shown in FIG. 7B conveys location information on the relevant component. The zoomed view 760 of the defect facilitates detailed view of the defect and allows an operator to determine with easy and at production speed whether the relevant component should be scraped or not. In addition, the zoomed view 760 of the defect allows an operator to inspect the splits of the component without specifying a part number being produced.

Figure 8:
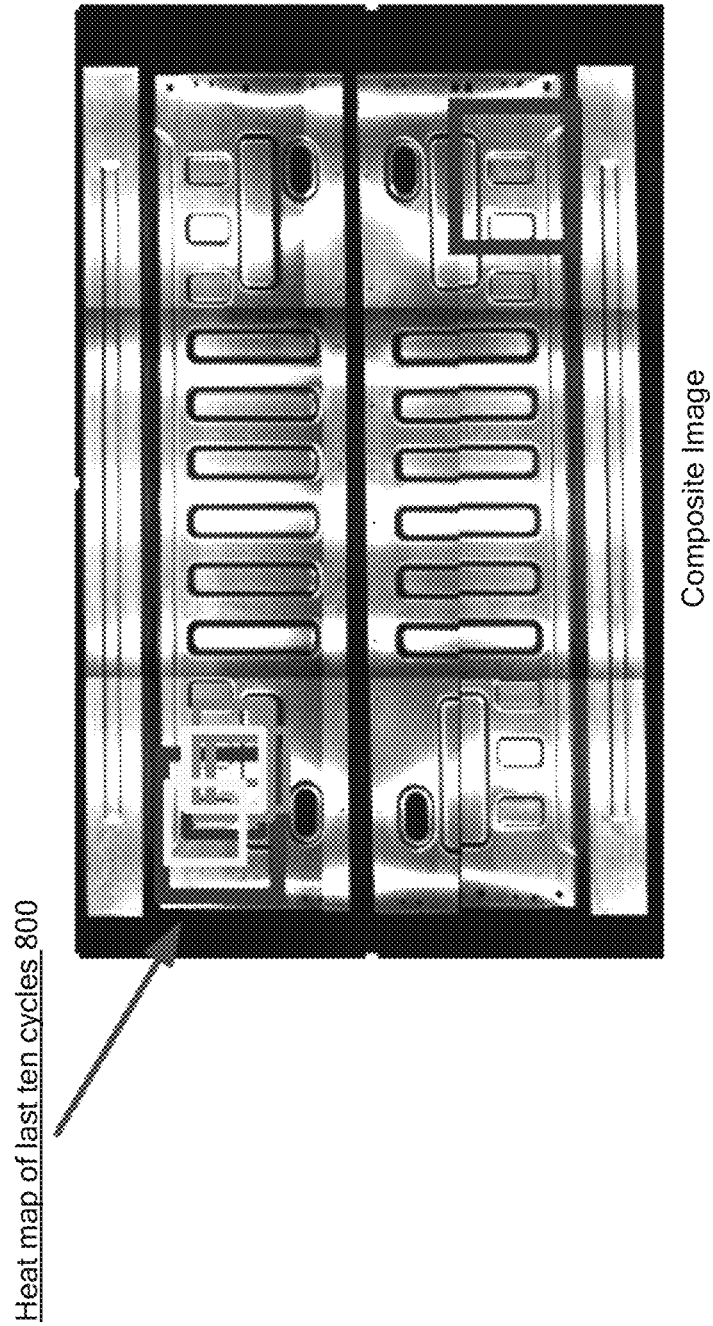
FIG. 8 illustrates another display of a composite image according to the teachings of the present disclosure.

FIG. 8 illustrates another example of a composite image according to the teachings of the present disclosure. In FIG. 8, the composite image illustrates multiple defects per a component 800 such as a door panel. In FIG. 8, heat map 800 of recent ten cycles is displayed. In other forms, heat map of ten or more cycles can be displayed.

Figure 9:
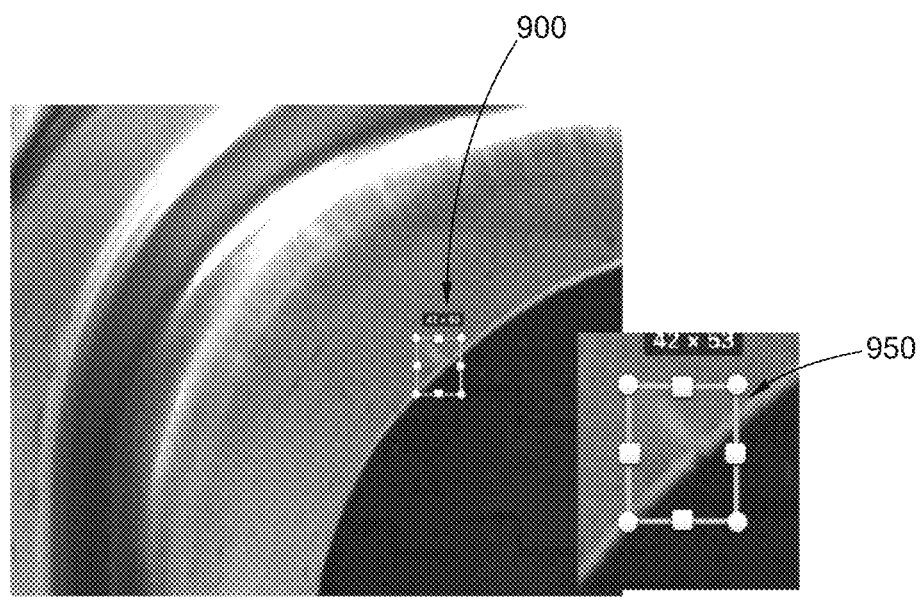
FIG. 9 illustrates further another display of a split image and a zoomed view according to the teachings of the present disclosure.
Figure 10B:
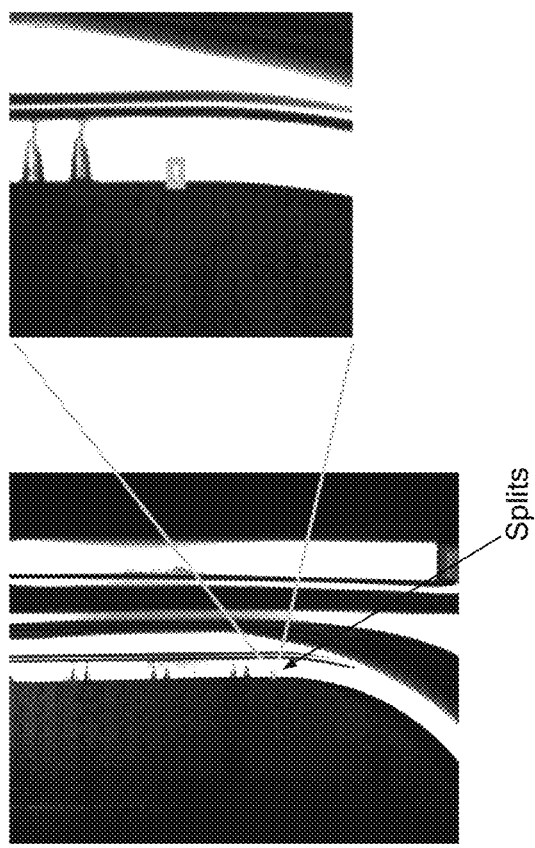
FIG. 10B illustrates one example of a split image according to the teachings of the present disclosure.
Figure 10A:
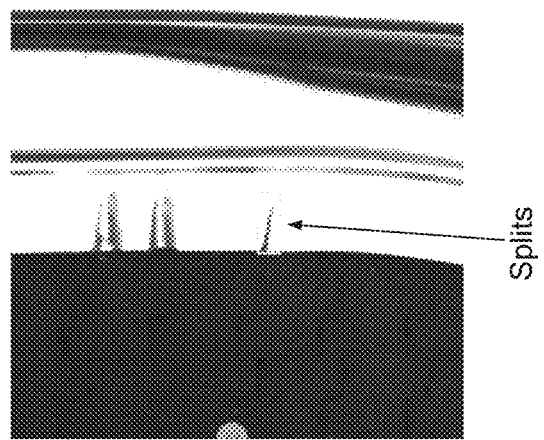
FIG. 10A illustrates one example of a split image according to the teachings of the present disclosure.

FIG. 9 illustrates further another example of a composite image according to the teachings of the present disclosure. In FIG. 9, the composite image illustrates defects at a different location 900 on the component such as the panel. As shown in FIG. 9, the composite image 900 of split and a zoomed view 950 of the split image are displayed.

FIGS. 10A and 10B, and FIG. 11A through FIG. 11C illustrate several examples of a composite image having split defects according to the teachings of the present disclosure. The split defects are identified with a box indictor. FIG. 10A through FIG. 10B and FIG. 11A through FIG. 11C show zoomed views of the split defects and a zoom ratio may be adjusted as needed.

Additionally, the defects identified with the inspection system according to the teachings of the present disclosure are subject to additional review and final conformation. The defects associated with a particular component are stored in and used to form a training database. If any defect may be missed, such missed defect is added to the training database. The training database will be used to train a neural network implementing deep learning algorithm which is stored in the memory 15 of the server 5 as shown in FIG. 2. The defects results are continuously monitored and updated and reflected in the training database to improve accuracy of the inspection system.

Figure 12:
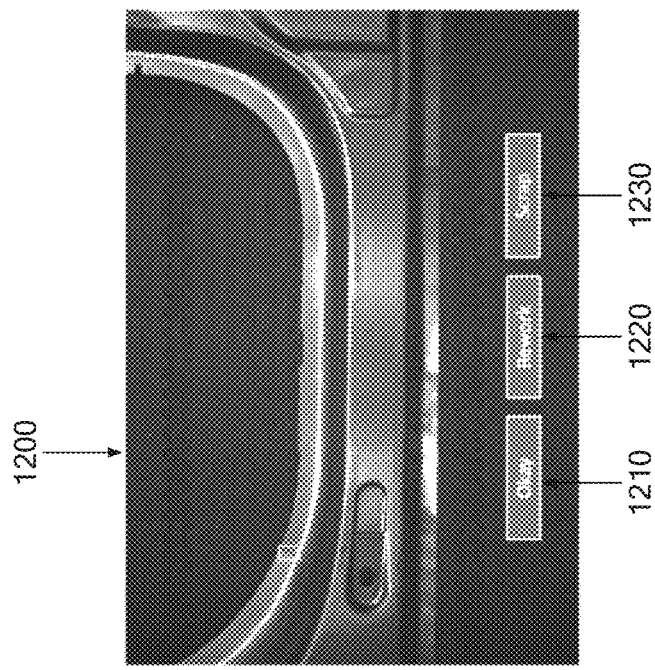
FIG. 12 illustrates a display of an inspection result on a user interface according to the teachings of the present disclosure.

FIG. 12 illustrates another user interface of the inspection system according to the teachings of the present disclosure. The user interface 1200 permits a user or a reviewer to inspect a defect. In some forms, the user interface 1200 also permits a user to zoom a defect with a single tap and make single-tap adjustments to image brightness. The user interface 1200 displays action buttons including Approval, Scrap, Warning, etc. As shown in FIG. 12, Approval of a component is displayed as a "Okay" button 1210, Warning of a component is displayed as a "Rework" button 1220, and Scrap of a component is displayed as a "Scrap" button 1230 in some forms. In other forms, different action menus are possible.

Figure 13:
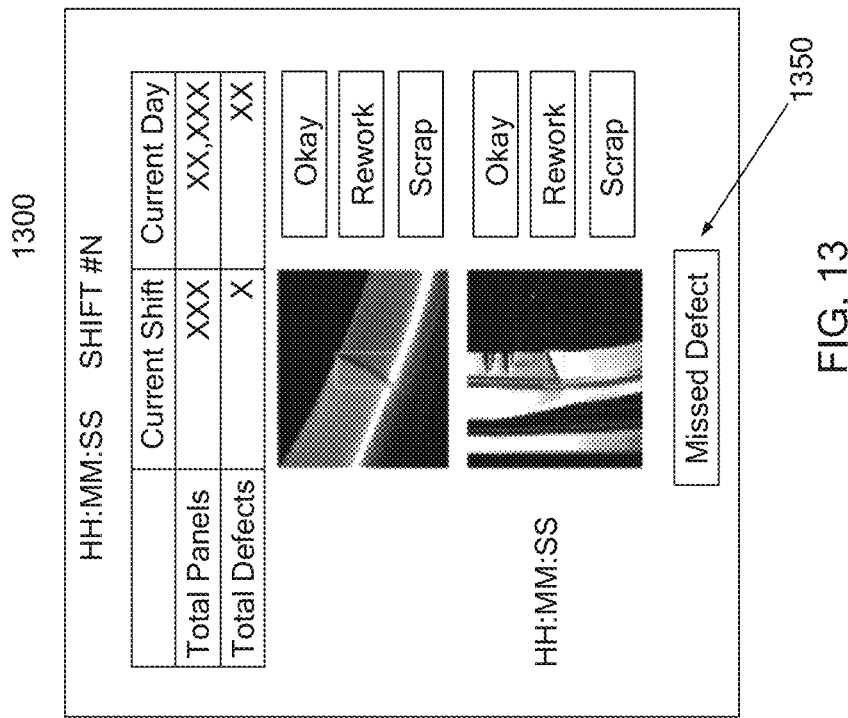
FIG. 13 illustrates another display of an inspection result on a user interface according to the teachings of the present disclosure.

FIG. 13 illustrates further another user interface of the inspection system according to the teachings of the present disclosure. The user interface 1300 shows summary counts of defects among total components, e.g., panels as shown in FIG. 13. In some forms, the summary counts of defects may be updated in quasi-real-time. As shown in FIG. 13, two or more components may be displayed together along with action buttons, which permits faster processing by a user. FIG. 13 further illustrates a "Missed Defect" button 1350 which allows a user to input and record a missed defect if any into a relevant storage and form a database.

As described above, the inspection system and method may be performed with artificial intelligence (AI) implemented with deep learning algorithm. Testing has been performed and AI confidence score and AI pass/fail result have been reviewed with respect to thirty-two (32) samples of door opening panels. The thirty-two (32) samples include twenty-two (22) known defective panels and ten (10) known good panels. The defective panels used include defects ranged from faint white lines to very large splits. It was observed that the inspection system according to the teachings of the present disclosure passed both variable and attribute gage studies known in the AI field. It was also observed that upon review of the results from the inspection system, the inspection results by the inspection system and the review results by a reviewer matched above 96% accuracy.

A component inspection system and method according to the teachings of the present disclosure provides an automatic inspection system that flags possible defected components at high production speed with 2-D image data from the cameras. The component inspection system improves quality of the inspection by removing the variability of manual inspection. These and other advantages related can be realized by the component inspection system/method of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. An inspection system for automotive components comprising:
one or more multi-dimensional cameras configured to capture images corresponding to a selected automotive component, wherein the cameras generate a data set that correspond to images of a same or different part of the selected automotive component;
a controller communicably coupled to the cameras to receive the data set from the cameras;
a conveyor structure operable to transport the selected automotive component; and
wherein the cameras are synchronized and triggered to capture the images of the selected automotive component with the controller;
wherein the controller is configured to:
generate a composite image of the selected automotive component based on the data set;
recognize presence or absence of a defect based on the composite image of the selected automotive via artificial intelligence based training; and
determine whether an anomaly is present with respect to the selected automotive component; and
generate an output indicative of the selected automotive component with or without anomaly prior to the selected automotive component being removed from the conveyor structure,
wherein the controller is further configured to, upon detection of the anomaly, identify a location of the anomaly at a production speed of the inspection system.

2. The inspection system of claim 1, further comprising a row of one or more platforms installed at or adjacent to an entry point of the conveyor structure, each platform spaced apart from a neighboring platform and having a plurality of cameras installed thereon,
the row of one or more platforms arranged to be in parallel to the conveyor structure such that the cameras face and capture images of the selected automotive component transported on the conveyor structure; and
wherein the cameras are synchronized and triggered, via a light curtain, to capture the images of the selected automotive component substantially simultaneously.

3. The inspection system of claim 1, wherein identifying the location of the anomaly at the production speed comprises identifying the location of the anomaly at the production speed by mapping to a prestored anomaly template of the composite image.

4. The inspection system of claim 3, wherein the controller is further configured to display the selected automotive component having anomaly with the location of the anomaly on a user interface at the production speed of the inspection system.

5. The inspection system of claim 1, wherein the controller is further configured to identify a classification of the anomaly via artificial intelligence based training.

6. The inspection system of claim 1, further comprising a light emitting diode (LED) fault indicator installed in the conveyor structure and extending in a direction along which the conveyor structure extends.

7. The inspection system of claim 6, wherein the LED fault indicator is configured to:
output a first color upon determination that the selected automotive component is normal; and
output a second color upon determination that the selected automotive component is defective.

8. The inspection system of claim 6, wherein the LED fault indicator further comprises a sequence of LED lights and an LED light output in the second color follows the defective component as the defective component transports on the conveyor structure.

9. The inspection system of claim 1, wherein the controller is further configured to generate the output that displays the selected automotive component and a zoomed view of a defect of the selected automotive component.

10. The inspection system of claim 9, wherein the controller is further configured to generate the output including:
a menu that prompts selection of a scrap of the selected automotive component upon determination that the selected component is defective;
two or more selected automotive components side by side;
a total count of selected automotive components; and
a total count of defective components.

11. The inspection system of claim 10, wherein the controller is configured to update the output on a quasi-real time basis.

12. The inspection system of claim 1 further comprising:
a plurality of LED strip lights installed on the row of platforms; and
a plurality of LED diffusion lamps arranged adjacent to the row of platforms;
wherein the plurality of LED strip lights and the plurality of LED diffusion lamps provide lighting for operations of the cameras.

13. The inspection system of claim 12, wherein the plurality of LED strip lights are mounted on lower surfaces of the platforms, and
the plurality of LED diffusion lamps are installed in a space between two neighboring rows of the platforms.

14. An inspection method of automotive components, the method comprising:
transporting, on a conveyor structure, a selected automotive component;
arranging a network of cameras opposite to and parallel to the conveyor structure;
as the selected automotive component enters the conveyor structure, capturing image data of the selected automotive component with the network of cameras in a synchronized manner to obtain a set of data;
receiving, at a controller communicably coupled to the cameras, the image data from the cameras;
generating a composite image based on the image data from the cameras;
determining, by the controller including a deep learning network, whether an anomaly is present with respect to the selected automotive component based on identification from the composite image;
identifying, upon detection of the anomaly, a location of the anomaly at a production speed of the inspection system; and
generating, by the controller, an output indicative of the selected automotive component with or without anomaly prior to the selected automotive component being removed from the conveyor structure.

15. The inspection method of claim wherein identifying the location of the anomaly at the production speed comprises identifying the location of the anomaly at the production speed by mapping to a prestored anomaly template of the composite image.

16. The inspection method of claim 14 further comprising identifying a classification of the anomaly via an artificial intelligence classification based training.

17. The inspection system of claim 14, wherein generating the output further comprises displaying the selected automotive component having anomaly with the location of the anomaly on a user interface at a production speed of the inspection system.

18. The inspection method of claim 14 further comprising displaying, at the production speed of the inspection system, the output on a user interface screen in response to the anomaly being present, wherein the output includes a zoomed view of the anomaly and a menu button that prompts a scrap of the selected automotive component.

19. An inspection method of automotive components, the method comprising:
  capturing an image data of a selected component and generating a set of data with a row of camaras installed over a predetermined area of a conveyor structure at or adjacent to an entry point of the conveyor structure;
  generating, by a controller, a composite image of the selected component;
  determining, by the controller, whether anomaly is present based on a comparison of the composite image via artificial intelligence based training;
  upon detection of the anomaly, identifying presence or absence of the anomaly and a location of the anomaly based on a prestored anomaly template, wherein the anomaly comprises one or more of splits, burrs, scratches, or slug marks; and
  generating on a user interface, by the controller at a production speed of the inspection system, a display of the selected component, an anomaly at a location of the selected component, and a zoomed view of the anomaly.

20. The inspection method of claim 19, further comprising generating, at the production speed of the inspection system, an output that prompts or alerts removal of the selected component from a production line.

* * * * *